US009185098B2

(12) United States Patent
Harik et al.

(10) Patent No.: US 9,185,098 B2
(45) Date of Patent: Nov. 10, 2015

(54) METHOD FOR USER AUTHENTICATION

(71) Applicant: PageBites, Inc., Palo Alto, CA (US)

(72) Inventors: Ralph Harik, Palo Alto, CA (US); Georges Harik, Palo Alto, CA (US)

(73) Assignee: PageBites, Inc., Palo Alto, CA (US)

( * ) Notice: Subject to any disclaimer, the term of this patent is extended or adjusted under 35 U.S.C. 154(b) by 45 days.

(21) Appl. No.: 13/949,168

(22) Filed: Jul. 23, 2013

(65) Prior Publication Data

US 2014/0033284 A1    Jan. 30, 2014

Related U.S. Application Data

(60) Provisional application No. 61/675,188, filed on Jul. 24, 2012.

(51) Int. Cl.
*H04L 29/06* (2006.01)
*G06F 21/32* (2013.01)

(52) U.S. Cl.
CPC ............. *H04L 63/08* (2013.01); *G06F 21/32* (2013.01); *H04L 29/06* (2013.01)

(58) Field of Classification Search
CPC ........................ H04L 63/083; H04L 63/08
USPC ........................................... 726/5, 19
See application file for complete search history.

(56) References Cited

U.S. PATENT DOCUMENTS

| 5,247,497 | A | * | 9/1993 | Cohn | 369/26.01 |
|---|---|---|---|---|---|
| 5,774,525 | A | * | 6/1998 | Kanevsky et al. | 379/88.02 |
| 5,915,001 | A | * | 6/1999 | Uppaluru | 379/88.22 |
| 7,773,730 | B1 | * | 8/2010 | Kittrell et al. | 379/68 |
| 8,781,527 | B1 | * | 7/2014 | Fujisaki | 455/556.1 |
| 2002/0188725 | A1 | * | 12/2002 | Mani | 709/227 |
| 2006/0057550 | A1 | * | 3/2006 | Sahashi | 434/350 |
| 2006/0110712 | A1 | * | 5/2006 | Julia et al. | 434/156 |
| 2007/0118857 | A1 | * | 5/2007 | Chen et al. | 725/61 |
| 2007/0280638 | A1 | * | 12/2007 | Aoki et al. | 386/95 |
| 2008/0312902 | A1 | * | 12/2008 | Dollinger | 704/4 |
| 2010/0131273 | A1 | * | 5/2010 | Aley-Raz et al. | 704/247 |
| 2013/0265450 | A1 | * | 10/2013 | Barnes, Jr. | 348/207.1 |
| 2014/0129942 | A1 | * | 5/2014 | Rathod | 715/720 |

OTHER PUBLICATIONS

Privacy by Design—Principles of Privacy|http://cs.gmu.edu/~jpsousa/classes/699/papers/privacy%20Langheinrich.pdf|Marc Langheinrich|pp. 1-17|2001.*

* cited by examiner

*Primary Examiner* — Mahfuzur Rahman
(74) *Attorney, Agent, or Firm* — Edward C. Kwok; Hogan Lovells US LLP

(57) ABSTRACT

A method for verifying an identity of a user includes (a) receiving a request for an identification phrase from a user associated with a user account; (b) selecting the phrase from a pool of phrases and associating the phrase with the user account; (c) sending the phrase to the user; (d) receiving a video recording showing a person reading one or more phrases aloud, and (e) verifying that a phrase read by the person in the video recording corresponds to the selected phrase. A third party may desire verification of the user's identity. The method confirms to the third party the user's identity based on whether or not the phrase read aloud in the video recording matches the randomly selected phrase associated with the user account.

4 Claims, 1 Drawing Sheet

METHOD FOR USER AUTHENTICATION

CROSS REFERENCE TO RELATED APPLICATIONS

The present application relates to and claims priority of U.S. provisional patent application ("Provisional Application"), Ser. No. 61/675,188, entitled "Method for User Authentication," filed on Jul. 24, 2012. The disclosure of the Provisional Application is hereby incorporated by reference in its entirety.

BACKGROUND OF THE INVENTION

1. Field of the Invention

The present invention relates to verifying the identity of a user on a public computer network; in particular, the present invention provides user identity verification using a video sequence.

2. Discussion of the Related Art

User identity verification on the internet is a difficult problem. Various systems have been developed to help increase the likelihood (hence, the assurance) that a person is in fact who he or she purports to be. To verify the identity of a user, a typical resource on the internet (e.g., websites) merely relies on the user to present to the resource a previously established username and password combination. However, such a mechanism can easily be compromised in many ways. As online services become more sophisticated, it has become very important to have a reliable means for verifying a user's true identity.

There are many identity verification mechanisms already in use that distinguish between a request for access to a resource initiated by a human person from one that is initiated by an automaton (i.e., a computer program). For instance, some services employ "captchas" to ensure that the user presenting access credentials is a human person. On other sites, a user is required to submit his or her telephone number, so that the site may deliver a code to the submitted telephone number. The code thus delivered is required to be used by the user in a subsequent interaction with the site. In this method, the identity of the person is tied to a telephone number presented by the user. More recently, certain sites are mailing a postcard to an address submitted by the user as his or her home address. In this manner, the identity of a user is verified by a particular address submitted by the user. However, none of these services verifies the identity of a user by his or her appearance.

SUMMARY OF THE INVENTION

According to one embodiment of the present invention, a method for verifying an identity of a user may include (a) receiving a request for an identification verification from a user associated with a user account; (b) selecting a phrase and associating the phrase with the user account; (c) sending the selected phrase to the user; (d) receiving from the user a video recording showing a person reading aloud; and (e) verifying that a phrase read aloud in the video recording corresponds to the selected phrase. The method may further include comparing the appearance of the person in the video recording with an appearance of the user established by a third party.

According to one embodiment of the present invention, the method may further include making the video recording available for access by a third party.

According to one embodiment of the present invention, a method for verifying the identity of a user may include (a) obtaining from the user a video recording and identification information for a user account registered at a trusted authority, wherein the video recording shows a person reading one or more phrases aloud; and (b) obtaining from the trusted authority an assurance that the person appearing in the video recording is the user associated with the user account. In one instance, one or more of the phrases read aloud in the video recording was assigned to the user account by the trusted authority. The trusted authority may make available to a third party access to the video recording. A third party may obtain access to the video recording based on a link provided to the third party by a user.

According to one embodiment of the present invention, the user may obtain from the trusted authority an assurance by: (a) submitting the received video recording and the identification information to the trusted authority; (b) receiving from the trusted authority an assurance of the user's identity; and (c) accepting the assurance by the trusted authority as verification of the user's identity.

The present invention is better understood upon consideration of the detailed description below in conjunction with the accompanying drawings.

DETAILED DESCRIPTION OF THE PREFERRED EMBODIMENTS

Figure 1:
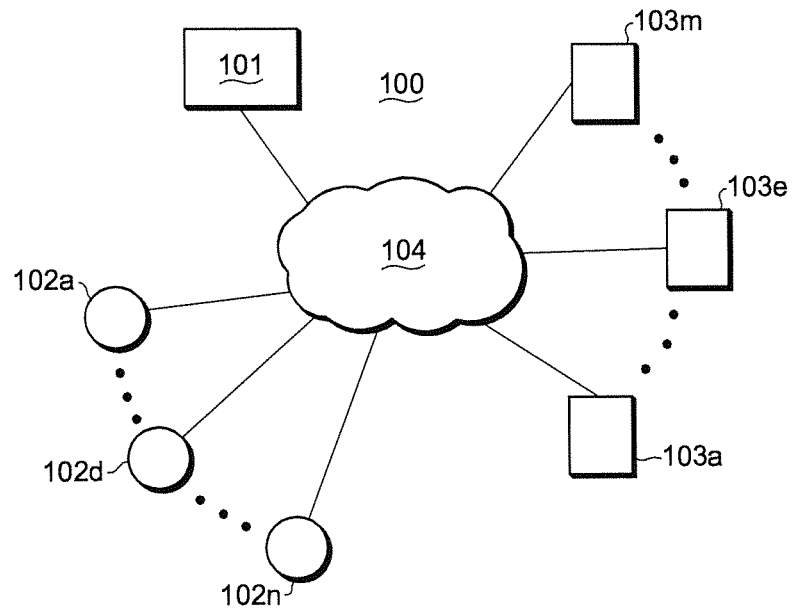
FIG. 1 is a block diagram showing system 100 which provides a method for verifying the identity of a user based on the user's appearance, in accordance with one embodiment of the present invention.

The present invention provides a mechanism or method to help verify a user using a video recording of the user's appearance. FIG. 1 is a block diagram showing system 100 to which the mechanism or method is applicable, in accordance with one embodiment of the present invention. As shown in FIG. 1, system 100 includes service 101, subscribers 102a ... 102n of service 101, and third parties 103a ... 103m interested in verifying the identity of any of subscribers 102a ... 102n. The participants of system 100 communicate over a wide area network 104, such as the Internet.

Figure 2:
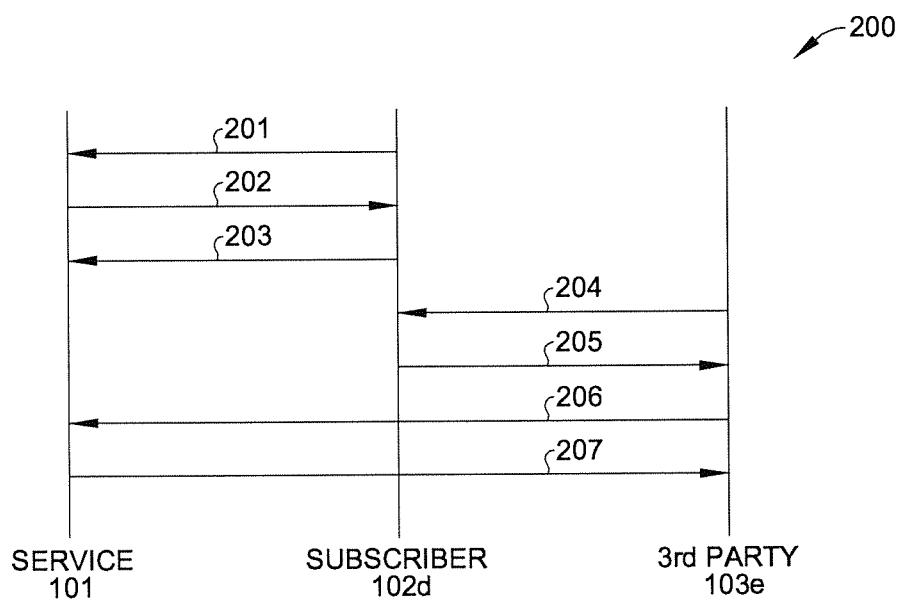
FIG. 2 illustrates method 200 for verifying the identity of a user (say, subscriber 102d of FIG. 1) based on the user's appearance, in accordance with one embodiment of the present invention.

FIG. 2 is illustrates method 200 for verifying the identity of a user (say, subscriber 102d of FIG. 1) based on the user's appearance, in accordance with one embodiment of the present invention. As shown in FIG. 2, at step 201, subscriber 102d accesses a server of service 101 over wide area network 104 to create a user account. In response, at step 202, service 101 presents to subscriber 102d a phrase that is associated with the user account, and instructs subscriber 102d to record himself or herself on video reading the phrase. Generally, the proffered phrase from service 101 is selected from a large pool to avoid anticipation by the subscribers. The phrase may also be selected randomly. Subscriber 102d then uses a video camera (e.g., a "web camera" peripheral provided on a computer) or a camera provided on a mobile device (e.g., a camera in a cellular telephone) to generate the required recording. That is, subscriber 102d creates a video recording of himself or herself reading aloud the selected phrase that service 101 provides. At step 203, subscriber 102d sends this video recording to service 101. Service 101 may review the video recording to verify that subscriber 102d has read the selected phrase aloud in a clearly audible fashion in the video. If appropriate, service 101 may require or obtain additional evidence to verify subscriber 102d's identity. In a social media site, for example, the additional evidence may be provided by a picture submitted by another subscriber in which subscriber 102d is tagged. In that situation, service 101 may authenticate subscriber 102d by comparing the appearance of the person in the video recording submitted by subscriber 102d against the appearances of the person tagged in the picture submitted by the other subscriber. In addition, photographs that may be suitable to serve as additional evidence need not be submitted by another person. In fact, a photograph that the subscriber keeps on his profile page may also serve as additional evidence.

The video recording created may be presented to those interested parties seeking to verify the identity of the user (e.g., other users of service 101, or to customer support representatives), along with an identification of the user account. Service 101 may make the authenticated or verified video recording accessible (e.g., on a profile page associated with subscriber 102d's user account) by other subscribers. If access to the video recording is made available without subscriber 102d's participation, any third party (e.g., third party 103e) may simply view the video recording without involving subscriber 102d. Otherwise, third party 103e may request identity verification from subscriber 102d at step 204. In response, subscriber 102d may provide third party 103e a link to the authenticated or verified video recording at service 101 without sending the video recording itself. Third party 103e may accept this verification of subscriber 102d's identity on the authority of service 101.

Alternatively, at step 205, subscriber 102d may send the recorded video to third party 103e, along with an identification of its user account at service 101. At step 206, third party 103e then sends the recorded video it received and the identification of the user account to service 101 for verification. At step 207, service 101 sends third party 103e a successful confirmation or a denial of subscriber 102d's identity.

Under the present invention, if the words a user reads on the video match the phrase associated with the user account, then it is more likely that the person in the video is the user associated with the user account to which the selected phrase has been assigned. Because the phrase is selected by a trusted service (i.e., service 101), and is assigned by the trusted service to the user account, it is more difficult for a user to falsify or spoof the video. When the video recording is made available by the trusted service, third parties may accept the video recording as authenticating of the user's identity on their own judgment (e.g., based on previous experience with the person appearing in the video or other indicia of authenticity), as the appearance of a person is difficult to forge.

The above detailed description is provided to illustrate the specific embodiments of the present invention and is not intended to be limiting. Various modifications and variations within the scope of the present invention are possible. The present invention is set forth in the accompanying claims.

The invention claimed is:

1. A method for a service provider to verify an identity of a user, comprising:
   receiving a request for an identification verification from the user;
   selecting, by the service provider, a phrase from a pool of phrases and registering the selected phrase to an account held by the user;
   sending the selected phrase to the user in response to the request for identification verification, and instructing the user to read aloud the selected phrase in a video recording;
   obtaining from the user over a computer network the video recording;
   verifying, by the service provider, that the selected phrase is being read aloud in the video recording; and
   granting access to the verified video recording over a computer network by a third party at a subsequent time, the third party seeking to verify the identity of the user, having obtained a copy of the verified video recording or a link to the verified video recording from the user.

2. The method of claim 1, further comprising confirming that the person reading the selected phrase aloud in the video recording has an appearance that corresponds to an appearance in a photograph associated with the user.

3. A method by a third party seeking to verify an identity of a user, comprising:
   obtaining from the user over a computer network a link to a video recording at a service provided by a trusted authority and identification information for a user account registered at the trusted authority, wherein the video recording displays the user reading one or more phrases aloud and wherein one or more of the phrases read aloud in the video recording were assigned to the user account by the trusted authority and verified by the trusted authority that the one or more phrases were read aloud in the video recording; and
   obtaining from the trusted authority over the computer network an assurance that the video recording is associated with the user account identified by the identification information upon presenting to the trusted authority the link and the identification information.

4. The method of claim 3, wherein the step of obtaining from the trusted authority an assurance comprises:
   submitting the link to the video recording and the identification information to the trusted authority;
   receiving from the trusted authority an assurance of the user's identity by virtue that the trusted authority grant access to the video recording; and
   accepting the assurance from the trusted authority as verification of the user's identity.

\* \* \* \* \*